United States Patent
Saito et al.

Patent Number: 6,022,294
Date of Patent: Feb. 8, 2000

[54] LOCK-UP CONTROL DEVICE

[75] Inventors: Yoshiharu Saito; Takanori Kon; Yasushi Inagawa; Masamitsu Fukuchi, all of Wako, Japan

[73] Assignee: Honda Giken Kogyo Kabushiki Kaisha, Tokyo, Japan

[21] Appl. No.: 09/153,303

[22] Filed: Sep. 15, 1998

[30] Foreign Application Priority Data

Sep. 17, 1997 [JP] Japan .................................. 9-252534
Sep. 22, 1997 [JP] Japan .................................. 9-257224

[51] Int. Cl.⁷ .............................. B60K 41/02; F16H 45/02
[52] U.S. Cl. ........................ 477/169; 192/3.28; 192/3.31
[58] Field of Search .................................. 192/3.29, 3.3, 192/3.31; 477/169, 61, 62

[56] References Cited

U.S. PATENT DOCUMENTS 5,468,196 11/1995 Minowa et al. ............................ 477/62
5,637,052  6/1997 Hirota et al. ............................. 477/61
5,839,989 11/1998 Saito et al. ............................. 477/143

FOREIGN PATENT DOCUMENTS 7-332479 12/1995 Japan .

Primary Examiner—Rodney H. Bonck
Assistant Examiner—Tisha D. Waddell
Attorney, Agent, or Firm—Armstrong, Westerman, Hattori, McLeland & Naughton

[57] ABSTRACT

A lock-up control device controls an engaging force of a lock-up clutch, which shares engine output with a torque converter to transmit it toward an input shaft of a transmission of a car. First, target driving force is produced based on accelerator pedal opening and car velocity. Then, required torque is produced based on a gear ratio and the target driving force. Target engine speed is produced based on the required torque, wherein the target engine speed is set to avoid occurrence of abnormal sounds and abnormal vibrations. Thus, the lock-up clutch is controlled in such a way that real engine speed does not become less than the target engine speed in case of a gear change corresponding to a shift-up operation, for example. Basically, the lock-up clutch is controlled to have engaging force, which is made as maximal as possible to improve fuel efficiency. In other words, the lock-up clutch is controlled to be as tightly as possible. Or, the lock-up clutch which is initially set at a tight state is turned off just after the gear change start timing if it is predicted that the real engine speed after the gear change will become lower than the target engine speed.

2 Claims, 7 Drawing Sheets

LOCK-UP CONTROL DEVICE

BACKGROUND OF THE INVENTION

1. Field of the Invention

This invention relates to lock-up control devices that control the engaging force of lock-up clutches, which share engine outputs with torque converters to transmit engine output toward input shafts of transmissions of cars. This application is based on Patent Application No. Hei 9-252534 and Patent Application No. 9-257224 both filed in Japan, the contents of which are incorporated herein by reference.

2. Description of the Related Art

Japanese Patent Application, Publication No. Hei 7-332479 discloses an example of a lock-up control device. This lock-up control device has a map of target slip ratios, which are considered effective to avoid occurrence of abnormal sounds such as indistinct sounds and abnormal vibrations such as surging. Herein, the target slip ratios are created in advance by experiments regarding real car travel profiles, wherein they are produced in connection with car speeds and accelerator pedal openings. Thus, the lock-up control device controls the lock-up clutch to provide the target slip, which is read from the map in connection with the car speed and accelerator pedal opening.

As described above, the map for controlling the lock-up clutch is created based on experimental data. So, considerable amounts of labor and cost are required to create such a map.

Even in the same type of the car, different maps are required in response to changes of gear ratios. So, every time the gear ratio is changed, it is necessary to provide a specific map whose content is created through experiments. As a result, enormous amounts of labor and cost are required to create multiple maps with regard to the same type of the car.

At a shift-up event, the aforementioned lock-up control device unconditionally turns off the lock-up clutch so as to set the engaging force at zero, so that only the torque converter works to transmit the engine output toward the input shaft.

In consideration of the improvement of fuel efficiency, it is preferable that the lock-up clutch is set at a "tight" side, in other words, the lock-up clutch should be set as tightly as possible.

For this reason, even if the lock-up clutch is set at the tight side before a gear change event, a gear change is performed while the lock-up clutch is maintained at the tight side.

However, in the case of the gearshift which is performed while the lock-up clutch is maintained at the tight side, a shift-up operation reduces a number of revolutions of the input shaft of the transmission, so engine speed is reduced as well. In such a case, it is predicted that the engine speed is reduced to a critical one that will easily induce occurrence of abnormal sounds such as indistinct sounds and abnormal vibrations such as surging.

SUMMARY OF THE INVENTION

It is an object of the invention to provide a lock-up control device that is capable of remarkably reducing amounts of labor and cost, which are required to make the setting to avoid occurrence of abnormal sounds such as indistinct sounds and abnormal vibrations such as surging, regardless of changes of gear ratios.

It is another object of the invention to provide a lock-up control device that is capable of avoiding occurrence of abnormal sounds such as indistinct sounds and abnormal vibrations such as surging at shift-up operations where the lock-up clutch is set as tightly as possible to improve fuel efficiency.

A lock-up control device of the present invention is provided to control the engaging force of a lock-up clutch, which shares engine output with a torque converter to transmit engine output toward an input shaft of a transmission of a car. Now, target driving force is produced based on accelerator pedal opening and car velocity. Then, required torque is produced based on a gear ratio and the target driving force. Target engine speed is produced based on the required torque, wherein the target engine speed is set to avoid occurrence of abnormal sounds and abnormal vibrations. Thus, the lock-up clutch is controlled in such a way that real engine speed does not become less than the target engine speed in case of a gear change corresponding to a shift-up operation, for example. Basically, the lock-up clutch is controlled to have an engaging force, which is made as maximum as possible to improve fuel efficiency.

In another aspect of the invention, the lock-up clutch is controlled based on comparison between the target engine speed and a predicted input shaft speed. Herein, the input shaft speed after the gear change is predicted at the gear change start timing. If the predicted input shaft speed is greater than the target engine speed, the lock-up clutch is controlled as tightly as possible during the gear change. If the predicted input shaft speed is smaller than the target engine speed, the lock-up clutch which is initially set at a tight state is turned off just after the gear change start timing.

Thus, it is possible to avoid occurrence of the abnormal sounds such as the indistinct sounds and the abnormal vibrations such as the surging while it is possible to improve the fuel efficiency.

BRIEF DESCRIPTION OF THE DRAWINGS

These and other objects, aspects and embodiments of the present invention will be described in more detail with reference to the following drawing figures, of which.

DESCRIPTION OF THE PREFERRED EMBODIMENTS

This invention will be described in further detail by way of examples with reference to the accompanying drawings.

Before specifically describing the lock-up control devices of this invention, a description will be given with respect to mechanical construction regarding the torque converter, transmission and lock-up clutch with reference to FIG. 1.

Figure 1:
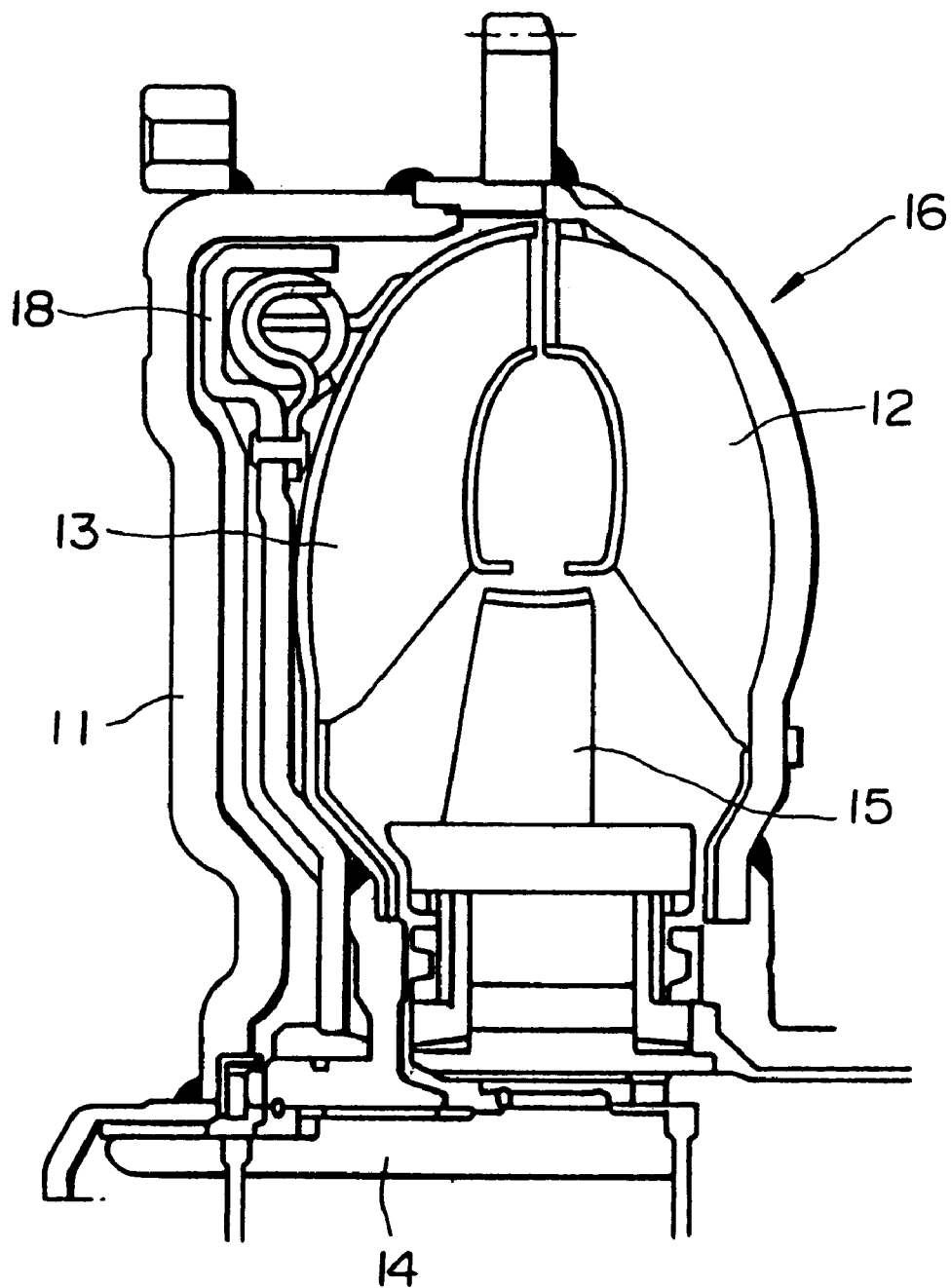
FIG. 1 is a sectional view showing a mechanical construction of a lock-up clutch and a torque converter.

In FIG. 1, a cover 11 is connected to a crank shaft, which corresponds to an output shaft of an engine (not shown). A pump impeller 12 is fixed to the cover 11 and is rotated by a driving force of the engine together with the cover 11. A turbine runner 13 is arranged at an opposite side of the pump impeller 12. An input shaft 14 of a transmission (not shown) is fixed to the turbine runner 13. A stator 15 is arranged at interior portions of the pump impeller 12 and turbine runner 13. Incidentally, the pump impeller 12, turbine runner 13 and stator 15 are assembled together to construct a torque converter 16.

A lock-up clutch 18 shares engine output with the torque converter 16 to transmit engine output toward the input shaft 14 of the transmission. The lock-up clutch 18 is arranged between the cover 11 and the turbine runner 13, while it is also fixed to the input shaft 14 of the transmission. In response to a hydraulic pressure difference between the cover 11 and the turbine runner 13, the lock-up clutch 18 comes in contact with or leaves from the cover 11.

In a fixed state where the lock-up clutch 18 is placed in contact with the cover 11, the lock-up clutch 18 is capable of directly transmitting driving force, input thereto from the engine, to the input shaft 14 of the transmission without intervening with the torque converter 16. In a separated state where the lock-up clutch 18 completely separates from the cover 11, the driving force input from the engine is fully transmitted to the pump impeller 12. In addition, fluid movement due to rotation of the pump impeller 12 makes the turbine runner 13 to rotate. Thus, the driving force is transmitted to the input shaft 14 of the transmission (by means of the torque converter 16).

As the aforementioned hydraulic pressure difference is controlled, a contact state established between the lock-up clutch 18 and the cover 11 (in other words, engaging force of the lock-up clutch 18) is controlled. Thus, it is possible to control distribution between a first amount of transmitted force that the driving force input from the engine is directly transmitted to the input shaft 14 of the transmission via the lock-up clutch 18 and a second amount of transmitted force that the driving force is transmitted to the input shaft 14 via the torque converter 16.

[Embodiment 1]

Figure 2:
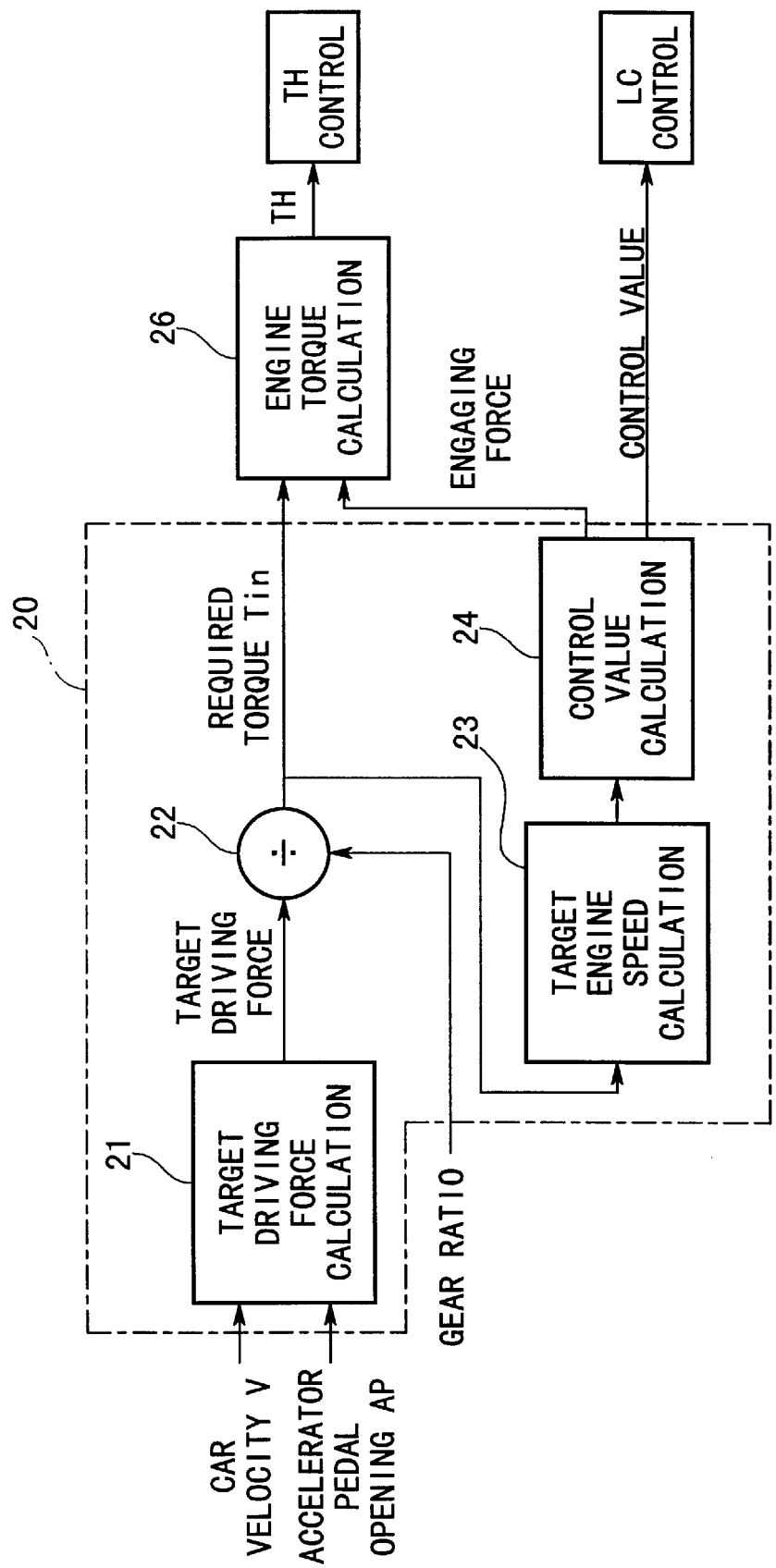
FIG. 2 is a block diagram showing a configuration of a lock-up control device in accordance with a first embodiment of the invention.

Now, a description will be given with respect to a lock-up control device 20 according to a first embodiment of the invention with reference to FIG. 2. The lock-up control device 20 controls duty solenoid (not shown) to control the aforementioned hydraulic pressure difference, so that engaging force established between the lock-up clutch 18 and the cover 11 is controlled. As shown in FIG. 2, the lock-up control device 20 is configured using a target driving force calculation unit 21, a required engine torque calculation unit 22, a target engine speed calculation unit 23 and a control value calculation unit 24.

Figure 3:
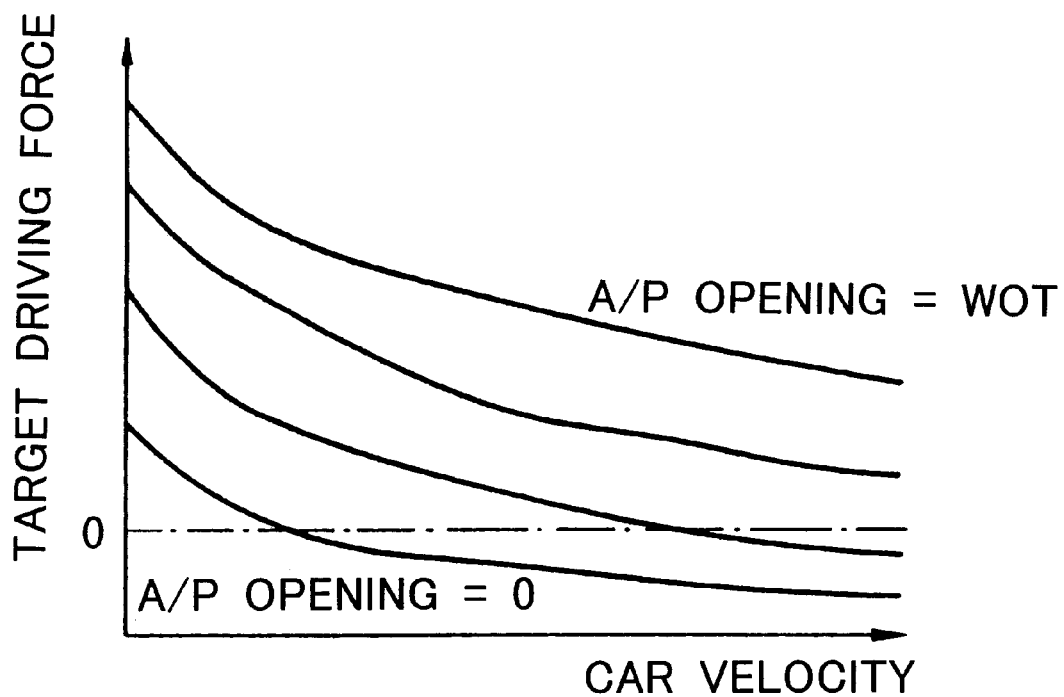
FIG. 3 is a graph showing relationships between target driving forces and car velocities in connection with accelerator pedal openings.

The target driving force calculation unit 21 produces target driving force of a car based on multiple parameters for estimating a driving state such as accelerator pedal opening AP and car velocity V. Based on detected values of the accelerator pedal opening AP and car velocity V, the target driving force calculation unit 21 calculates target driving force of the car suited to driver's intention to accelerate the car in accordance with a characteristic map, which is determined in advance as shown in FIG. 3. Thus, the target driving force calculation unit 21 outputs a signal representing the target driving force. In a graph of FIG. 3, a horizontal axis represents the car velocity V, while a vertical axis represents the target driving force. Herein, each of curves is drawn in response to each of present accelerator pedal openings. Incidentally, the accelerator pedal opening becomes large with respect to the curve which is positioned on the upper right portion of the graph. So, the upper-rightmost curve is drawn in response to a full opening state, where accelerator pedal opening AP is represented by "WOT" (representing "Wide Open Throttle").

The required engine torque calculation unit 22 produces required engine torque (hereinafter, simply referred to as "required torque") Tin, which is required to obtain the target driving force calculated by the target driving force calculation unit 21. Herein, the required torque Tin is calculated from a gear ratio corresponding to a shift position. Thus, the required engine torque calculation unit 22 outputs a signal representing the required torque Tin.

Figure 4:
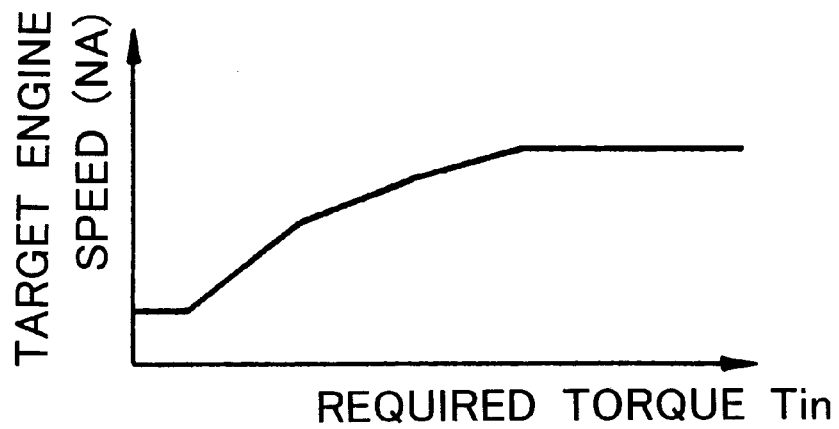
FIG. 4 is a graph showing a characteristic curve representing a relationship between target engine speed and car velocity.

Based on the required torque Tin produced by the required engine torque calculation unit 22, the target engine speed calculation unit 23 produces a target engine speed NA, which allows capability of outputting the required torque Tin and which also meets a prescribed condition. Thus, the target engine speed calculation unit 23 produces the target engine speed NA, by which it is possible to avoid occurrence of abnormal sounds such as indistinct sounds and abnormal vibrations such as surging. This engine speed NA is read from a table, which is provided in connection with the required torque Tin. FIG. 4 shows an example of the content of the table, which is set in advance based on experimental data. That is, FIG. 4 shows a characteristic curve, which is produced through experiments and is established between the required torque Tin and the target engine speed NA. The characteristic of FIG. 4 represents variations of the target engine speed NA, by which it is possible to avoid occurrence of the abnormal sounds such as the indistinct sounds and abnormal vibrations such as the surging. In general, the aforementioned abnormal sounds and abnormal vibrations occur if the engine speed is relatively low, while they are unlikely to occur if the engine speed is relatively high. For this reason, the target engine speed NA is set at minimum engine speed that is capable of suppressing the abnormal sounds and abnormal vibrations within allowable levels. In other words, if the actual engine speed is greater than the target engine speed NA, it is possible to suppress the abnormal sounds and abnormal vibrations within the allowable levels, that is, it is possible to substantially avoid occurrence of the abnormal sounds and abnormal vibrations.

Based on the target engine speed NA produced by the target engine speed calculation unit 23, the control value calculation unit 24 produces a control value for engaging force of the lock-up clutch 18. Herein, the control value calculation unit 24 determines the control value in the following manner.

(i) First case where the target engine speed NA is greater than a number of revolutions "Nin" of the input shaft 14 of the transmission.

In this case, when the lock-up clutch 18 works to directly connect the input shaft 14 to the engine, real engine speed is reduced down to the number of revolutions Nin of the input shaft 14, which is determined by the "present" car velocity. At this time, the real engine speed should be smaller than the target engine speed NA, which in turn causes occurrence of the aforementioned abnormal sounds and abnormal vibrations. In consideration of such a phenomenon, the control value calculation unit 24 determines the control value to let the lock-up clutch 18 slip while retaining the engaging force at an optimum state, which will be described later.

(ii) Second case where the target engine speed NA is smaller than the number of revolutions Nin of the input shaft 14 of the transmission.

In this case, when the lock-up clutch 18 works to directly connect the input shaft 14 to the engine, real engine speed becomes identical to the number of revolutions Nin, which is determined by the "present" car velocity. At this time, however, there is no possibility that the real engine speed becomes smaller than the target engine speed NA. For this reason, the aforementioned abnormal sounds and abnormal vibrations do not occur. So, to improve the fuel efficiency, the control value calculation unit 24 determines the control value that makes the engaging force maximal to establish direct connection of the lock-up clutch 18.

Based on the control value that is determined by the control value calculation unit 24, the lock-up control device of the present embodiment electrically controls the duty solenoid (not shown), which is used to control the lock-up clutch. Thus, it is possible to control the engaging force of the lock-up clutch 18.

The foregoing required torque Tin produced by the required engine torque calculation unit 22 and the foregoing engaging force of the lock-up clutch 18 produced by the control value calculation unit 24 are supplied to an engine torque calculation unit 26.

Based on the required torque Tin and engaging force, the engine torque calculation unit 26 produces required throttle opening TH, by which a throttle is electrically controlled.

Figure 5:
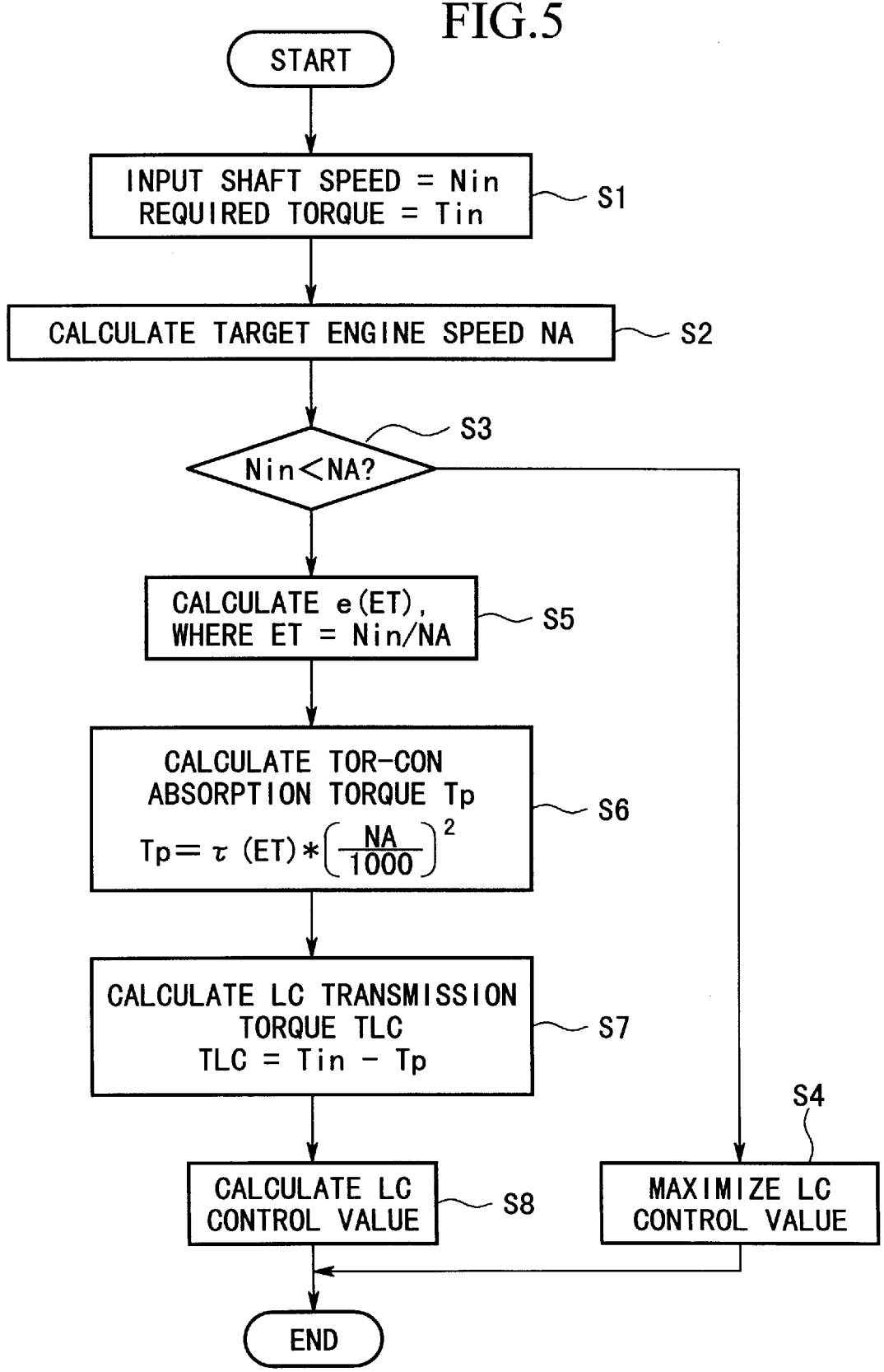
FIG. 5 is a flowchart showing operation of the lock-up control device of FIG. 2.

Next, operation of the lock-up control device 20 will be described with reference to a flowchart of FIG. 5. As described before, the target driving force calculation unit 21 produces target driving force based on accelerator pedal opening AP and car velocity V. In step S1, the required engine torque calculation unit 22 produces required torque Tin, which is required to obtain the target driving force. In addition, the lock-up control device 20 detects a number of revolutions "Nin" of the input shaft 14 of the transmission, which will be referred to as input shaft speed Nin.

Then, the lock-up control device 20 transfers control to step S2, wherein based on the required torque Tin produced by the required engine torque calculation unit 22, the target engine speed calculation unit 23 produces a target engine speed NA in accordance with the foregoing table, the content of which is shown in FIG. 4.

In step S3, the control value calculation unit 24 makes a decision as to whether the target engine speed NA produced by the target engine speed calculation unit 23 is greater than the number of revolutions Nin of the input shaft 14 of the transmission or not. In the case where the target engine speed NA is not greater than the number of revolutions Nin of the input shaft 14 of the transmission, there is no possibility that the aforementioned abnormal sounds and abnormal vibrations occur because real engine speed would not be smaller than the target engine speed NA even if the lock-up clutch 18 works to directly connect the input shaft 14 to the engine. In this case, the control device 20 transfers control to step S4. Herein, in order to improve the fuel efficiency, the control value calculation unit 24 determines a control value to be maximal to establish the direct connection of the lock-up clutch 18.

In the case where the step S3 makes a decision that the target engine speed NA is greater than the number of revolutions Nin of the input shaft 14 of the transmission, the control device 20 transfers control to step S5. Herein, the control value calculation unit 24 performs a calculation of "(number of revolutions Nin)/(target engine speed NA)" to produce a value ET for a target slip ratio, which places the real engine speed within a specific range where the real engine speed would not be smaller than the target engine speed NA.

In step S6, the control device 20 produces tor-con absorption torque Tp, which is absorbed by the torque converter 16, in accordance with a formula as follows:

$$T_p = \tau(ET)*(NA/1000)^2$$

Figure 6:
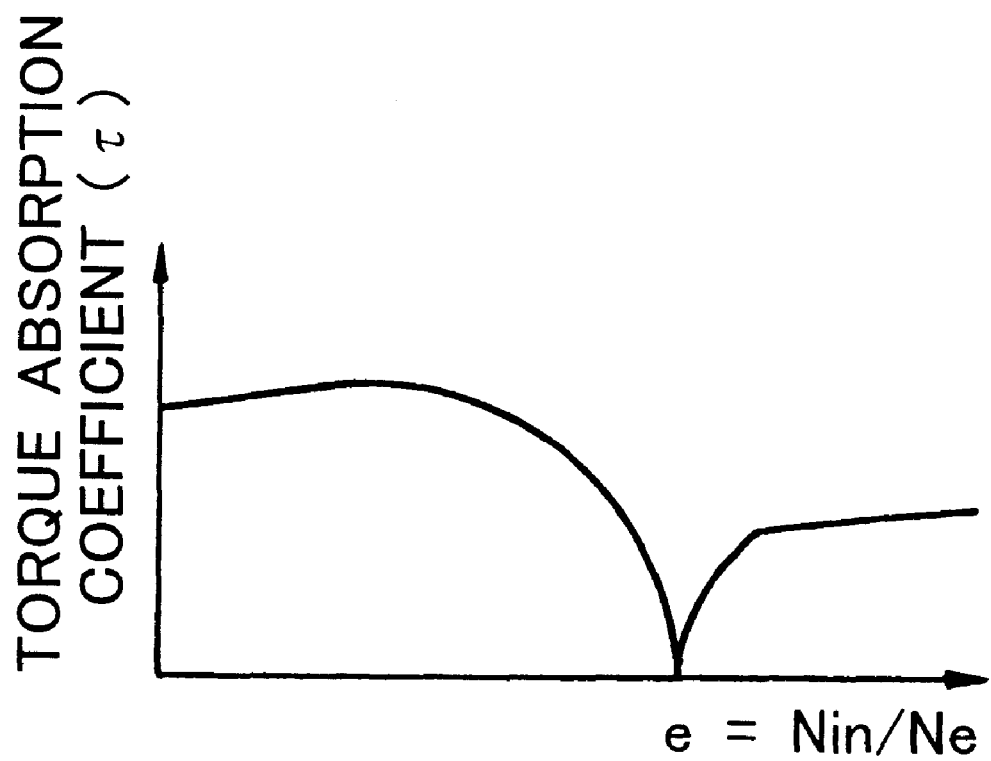
FIG. 6 is a graph showing a relationship between torque absorption coefficient and slip ratio, which is used for calculation of tor-con absorption torque.

Herein, $\tau$ represents torque absorption coefficient of the torque converter 16, so $\tau(ET)$ is produced in consideration of a slip ratio e (=Nin/Ne, see FIG. 6) and a table which is prepared in advance with respect to $\tau$.

In step S7, the control device 20 produces transmission torque TLC in accordance with a formula as follows:

$$TLC = Tin - Tp$$

That is, the transmission torque TLC of the lock-up clutch 18 is calculated by subtracting the torque which is transmitted by the torque converter 16 from the required torque Tin.

In step S8, the control value calculation unit 24 determines a control value to provide the lock-up clutch 18 with engaging force corresponding to the transmission torque TLC.

By controlling the aforementioned control value, it is possible to obtain the maximum engaging force within a certain range of amounts of engaging force that the real engine speed would not be smaller than the target engine speed NA.

Using the aforementioned control value determined by the control value calculation unit 24, the lock-up control device 20 electrically controls the duty solenoid (not shown) for controlling the lock-up clutch 18. Thus, the control device 20 controls the engaging force of the lock-up clutch 18.

Operations of the lock-up control device 20 can be summarized as follows:

When the required engine torque calculation unit 22 produces the required engine torque Tin which is required to obtain the target driving force, the target engine speed calculation unit 23 performs the foregoing calculation based on the required engine torque Tin to produce the target engine speed NA, which is effective to avoid occurrence of the abnormal sounds such as indistinct sounds and the abnormal vibrations such as surging. Then, the control value calculation unit 24 produces the control value for the engaging force of the lock-up clutch 18 to make the real engine speed to be greater than the target engine speed NA. Using the control value, the control device 20 controls the lock-up clutch 18.

Therefore, it is possible to normally provide the "effective" engine speed against the occurrence of the abnormal sounds such as the indistinct sounds and the abnormal vibrations such as the surging. In other words, the engine controls the lock-up clutch 18 to cope with the occurrence of the abnormal sounds such as the indistinct sounds and the abnormal vibrations such as the surging. For this reason, it is unnecessary to cope with changes of the gear ratios by using the control characteristic of the lock-up clutch 18.

In addition, the present embodiment is basically designed such that the engaging force of the lock-up clutch 18 is made maximal to improve fuel efficiency. Further, when the abnormal sounds such as the indistinct sounds and the abnormal vibrations such as the surging occur due to the "maximum" setting of the engaging force of the lock-up clutch 18, the present embodiment allows the lock-up clutch 18 slip to control revolutions of the engine such that the abnormal sounds and abnormal vibrations can be limited within allowable levels. For this reason, the present embodiment does not require the map for controlling the lock-up clutch 18 based on the car velocity and accelerator pedal opening. Thus, it is possible to remarkably reduce amounts of labor and cost required for the setting to avoid occurrence of the abnormal sounds such as the indistinct sounds and the abnormal vibrations such as the surging.

[Embodiment 2]

Figure 7:
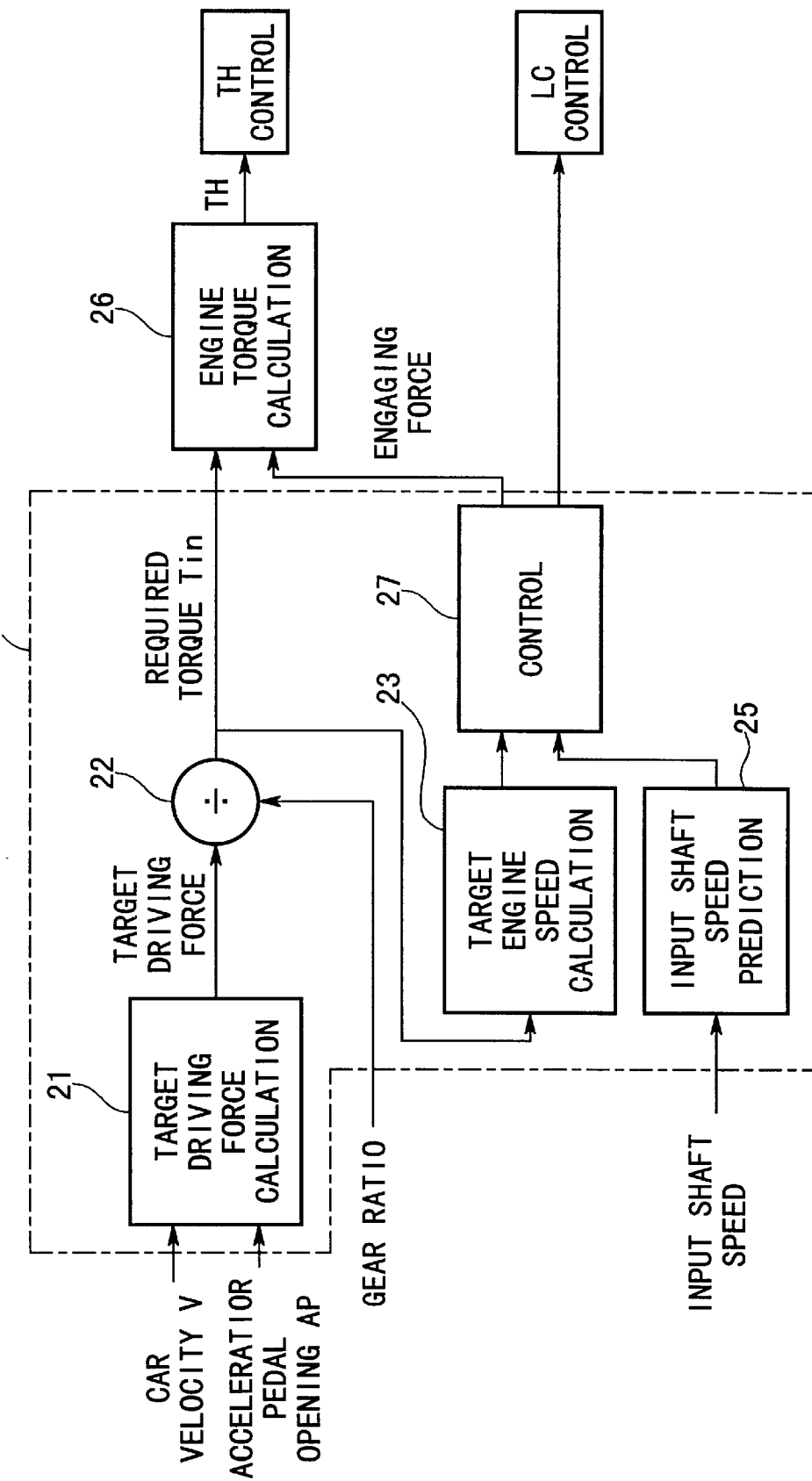
FIG. 7 is a block diagram showing a lock-up control device in accordance with a second embodiment of the invention.

Next, a description will be given with respect to a lock-up control device in accordance with a second embodiment of the invention with reference to FIG. 7. In FIG. 7, parts equivalent to those of FIG. 2 will be designated by the same reference symbols; hence, the description thereof will be omitted.

As compared with the first embodiment of FIG. 2, the second embodiment of FIG. 7 is characterized by providing an input shaft speed prediction unit 25 and a control unit 27, wherein "input shaft speed" is a number of revolutions of the input shaft 14 of the transmission.

The input shaft speed prediction unit 25 predicts a number of revolutions NM of the input shaft 14 of the transmission after a shift-up operation of gears, in other words, the input shaft speed prediction unit 25 predicts an input shift speed NM after a gear change that is made between third gear position and fourth gear position, for example. Herein, the input shaft speed prediction unit 25 performs prediction at the start timing of the gear change. Based on the input shift speed at the start timing of the gear change as well as the gear ratio, the input shaft speed prediction unit 25 calculates a changed input shift speed NM as a prediction value.

In the case where a certain gear change condition that allows a gear change is established while it is detected that the gear change corresponds to the shift-up operation of gears, the control unit 27 performs operations as follows:

At the start timing of the gear change, the input shaft speed prediction unit 25 produces a predicted input shaft speed NM after the gear change. On the other hand, the target driving force calculation unit 21 produces target driving force based on accelerator pedal opening AP and car velocity V which are detected at the start timing of the gear change. Based on the target driving force, the required engine torque calculation unit 22 performs a calculation using the gear ratio, corresponding to the changed gear position, to produce required torque Tin. So, based on the required torque Tin, the target engine speed calculation unit 23 produces target engine speed NES, by which it is possible to avoid occurrence of abnormal sounds and abnormal vibrations. Thus, the control unit 27 performs comparison between the predicted input shaft speed NM and the target engine speed NES.

If the predicted input shaft speed NM is less than the target engine speed NES, the control unit 27 turns off the lock-up clutch 18 during the gear change. In addition, the control unit 27 controls the duty solenoid (not shown) in such a way that the OFF state of the lock-up clutch 18 is maintained until completion of the gear change.

If the predicted input shaft speed NM is greater than the target engine speed NES, the control unit 27 controls the duty solenoid in such a way that engaging force of the lock-up clutch 18 that is established before the gear change is maintained after completion of the gear change.

After the completion of the gear change, the control unit 27 controls the lock-up clutch 18 in accordance with another control routine (which is not specifically described herein) until another gear change condition that allows a next gear change is established.

The engine torque calculation unit 26 for controlling the engine is supplied with the required torque Tin produced by the required engine torque calculation unit 22 as well as the engaging force of the lock-up clutch 18 produced by the control unit 27.

Based on the required torque Tin and the engaging force of the lock-up clutch 18, the engine torque calculation unit 26 produces required throttle opening TH, by which the throttle is electrically controlled.

Next, real operations (or effects) of the aforementioned lock-up control device 20 of FIG. 7 will be described in a concrete manner by taking examples of FIG. 7 and FIG. 8.

Figure 8:
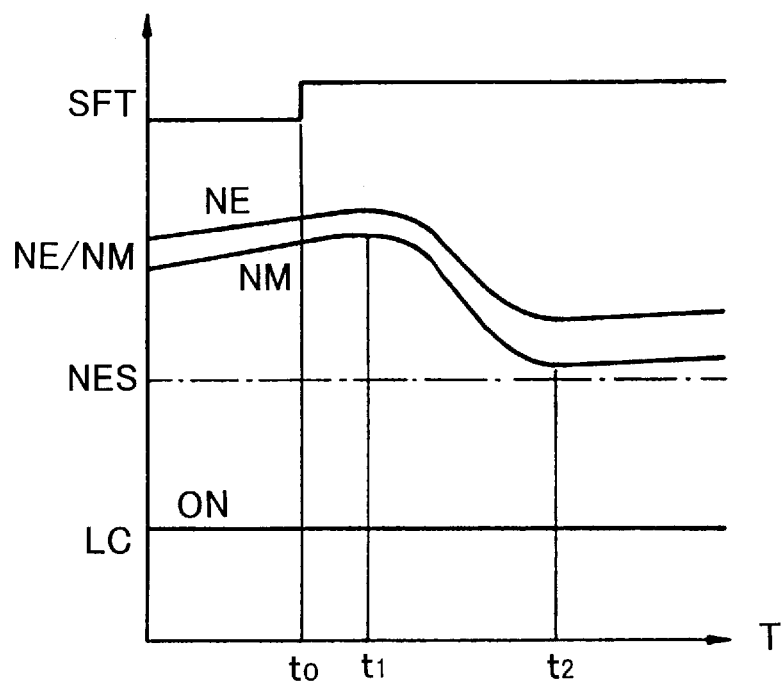
FIG. 8 is a graph showing relationships between input shaft speed and engine speed in response to a first example of control of the lock-up clutch.

(i) First example shown in FIG. 8 where the engine speed which is initially high is reduced during a gear change corresponding to a shift-up operation.

FIG. 8 shows a transition of the engine speed, wherein the lock-up clutch 18 which is initially set at a tight state (or ON state) prior to the gear change is controlled to cope with the shift-up operation. At time $t_0$, a gear change condition is established while a shift-up command signal is issued. At time $t_1$ when the gear change is initiated, the input shaft speed prediction unit 25 produces a predicted input shaft speed NM that the input shaft 14 is predicted to have at time $t_2$ which is after the gear change. Based on accelerator pedal opening AP and car velocity detected at the time $t_1$ to start the gear change, the target driving force calculation unit 21, the required engine torque calculation unit 22 and the target engine speed calculation unit 23 cooperate together to produce target engine speed NES, by which it is possible to avoid occurrence of abnormal sounds and abnormal vibrations. If the predicted input shaft speed NM is greater than the target engine speed NES, the control unit 27 controls the lock-up clutch 18 in such a way that the lock-up clutch 18 which is initially set at the tight state prior to the gear change continues the tight state during the gear change. In response to the input shaft speed NM, the engine speed NE is reduced during the gear change. However, even if the lock-up clutch 18 is retained in the tight state during the gear change, there is no possibility that the engine speed NE at the time $t_2$ when the gear change is ended would not be smaller than the target engine speed NES. Therefore, it is possible to avoid occurrence of the abnormal sounds and abnormal vibrations.

Figure 9:
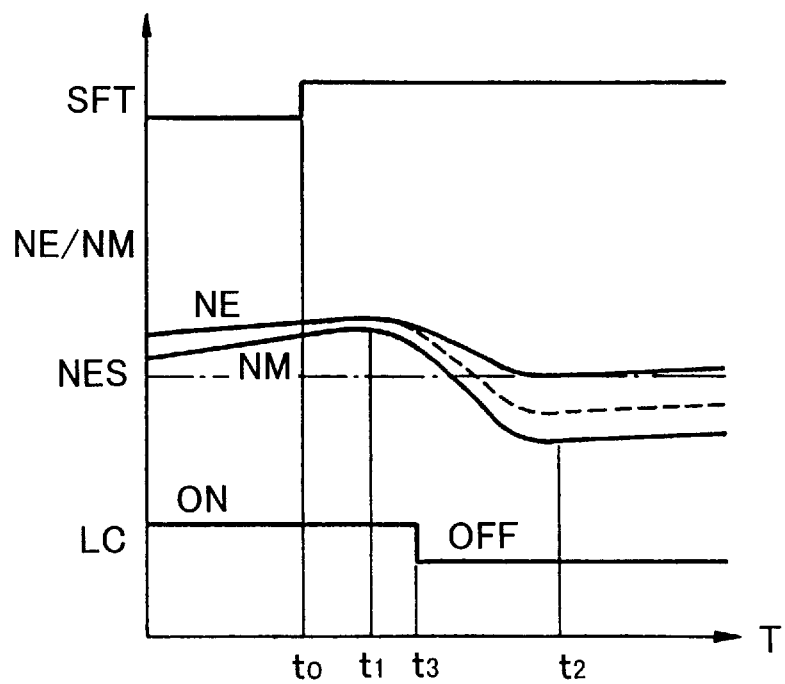
FIG. 9 is a graph showing relationships between input shaft speed and engine speed in response to a second example of control of the lock-up clutch.

(ii) Second example shown in FIG. 9 where the engine speed which is initially low is reduced during a gear change corresponding to a shift-up operation.

FIG. 9 shows a transition of the engine speed, wherein the lock-up clutch 18 which is initially set at a tight state (or ON state) is controlled to cope with the shift-up operation. At time $t_0$, a gear change condition is established while a shift-up command signal is issued. At time $t_1$ when the gear change is initiated, the input shaft speed prediction unit 25 produces predicted input shaft speed NM that the input shaft 14 is predicted to have at time $t_2$ which is after the gear change. Based on accelerator pedal opening AP and car velocity V detected at the time $t_1$ to start the gear change, the target driving force calculation unit 21, the required engine torque calculation unit 22 and the target engine speed calculation unit 23 cooperate together to produce target engine speed NES, by which it is possible to avoid occurrence of abnormal sounds and abnormal vibrations. If the predicted input shaft speed NM is smaller than the target engine speed NES, the control unit 27 controls the lock-up clutch 18, which is set at the tight state prior to the gear change, to be in an OFF state (where engaging force is zero) at prescribed time $t_3$ which comes just after the time $t_1$ to start the gear change. If the lock-up clutch 18 is retained in the tight state during the gear change, the engine speed NE would be smaller than the target engine speed NES, which is shown by a dotted line in FIG. 9. In contrast, the present embodiment controls the lock-up clutch 18 to turn OFF, so that as shown by a solid line in FIG. 9, it is possible to secure relatively high engine speed, which is not reduced so much as compared with the input shaft speed NM. Therefore, it is possible to avoid an event that the engine speed NE becomes smaller than the target engine speed NES at the time $t_2$ when the gear change is ended. Thus, it is possible to avoid occurrence of the abnormal sounds and abnormal vibrations.

Moreover, the input shaft speed prediction unit 25 predicts the "future" input shaft speed NM at the gear change start timing for the shift-up operation. At the gear change start timing, the target driving force calculation unit 21, the required engine torque calculation unit 22 and the target engine speed calculation unit 23 cooperate together to produce the "future" target engine speed NES after the gear change. Then, the present embodiment compares them to turn OFF the lock-up clutch 18 during the gear change. Therefore, the driver does not have a feeling of wrongness due to the aforementioned operation of the lock-up clutch 18 in the shift-up operation.

As described heretofore, the present embodiment controls the lock-up clutch 18 as tightly as possible in the shift-up operation to improve the fuel efficiency. In addition, the present embodiment avoids occurrence of abnormal sounds like indistinct sounds and abnormal vibrations like surging after the shift-up operation.

The aforementioned description is made by taking examples that the lock-up clutch 18 is initially set at the tight state to start the gear change. Of course, the present embodiment works well even in a slip control state where the lock-up clutch 18 is currently slipping to have a certain amount of engaging force. In such a state, the present embodiment retains the engaging force during the gear change as long as the predicted input shaft speed NM is greater than the target engine speed NES, while the present embodiment controls the lock-up clutch 18 to turn OFF if the predicted input shaft speed NM is smaller than the target engine speed NES.

Moreover, it is possible to modify the present embodiment in the case where the predicted input shaft speed NM is smaller than the target engine speed NES, as follows:

Instead of the aforementioned control of the control the lock-up clutch 18 which is merely turned OFF to cancel the engaging force, the control unit 27 controls the lock-up clutch 18 to reduce the engaging force up to the minimally required limit so that the engine speed NE after the gear change is continued to be greater than the target engine speed NES.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A lock-up control device for controlling engaging force in a lock-up clutch so as to change an amount of torque transmitted to the lock-up clutch, said lock-up control device comprising:

target driving force calculation means for producing target driving force of a car on the basis of a plurality of parameters used for determining a driving state;

required engine torque calculation means for producing required engine torque that is required to obtain the target driving force;

target engine speed calculation means for producing target engine speed, which meets a prescribed condition, on the basis of the required engine torque; and control value calculation means for producing a control value for controlling the engaging force of the lock-up clutch on the basis of the target engine speed.

2. A lock-up control device for controlling engaging force in a lock-up clutch so as to change an amount of torque transmitted to the lock-up clutch, said lock-up control device comprising:

input shaft speed prediction means for predicting input shaft speed after a shift-up operation of a transmission;

target driving force calculation means for producing target driving force based on a plurality of parameters used for determining a driving state;

required engine torque calculation means for producing required engine torque that is required to obtain the target driving force;

target engine speed calculation means for producing target engine speed, which meets a prescribed condition, on the basis of the required engine torque; and control means for controlling the engaging force of the lock-up clutch to a predetermined value if the predicted input shaft speed is less than the target engine speed.

* * * * *